2,940,928

DYE-CLAY GREASE COMPOSITION AND MANUFACTURING PROCESS THEREFOR

Ronald J. Dupzyk, Pittsburg, and Harold A. Woods, Martinez, Calif., assignors to Shell Oil Company, a corporation of Delaware No Drawing. Filed Apr. 28, 1958, Ser. No. 731,143

8 Claims. (Cl. 252—28)

This invention relates to an improved process for the preparation of grease compositions. Moreover, it is related to improved grease compositions containing as the major gelling agent clays bearing strongly adsorbed dyes.

As lubricants are required to perform at higher and higher temperatures because of increased speeds of engines and machines, the advent of jet propulsion and atomic energy as sources of power, etc., it has become increasingly difficult to provide greases fulfilling the requirements of such lubricants. In attempting to provide suitable greases, the art has progressed from the use of petroleum lubricant vehicles thickened with metal soaps of long chain fatty acids to more thermally stable synthetic lubricating oils such as the aliphatic diesters, silicone polymers, etc. thickened with such soaps or inorganic materials, such as silica gels or clays. The progress of thickener research has not in general kept pace with the development of lubricant vehicles. At operating temperatures as high as 400–450° F., there are few greases available which will retain their consistency and lubricity for any substantial period of time.

One of the prominent advances in the art of high temperature grease lubrication has comprised the provision of greases gelled with dyes or pigments, namely, indogen compounds, phthalocyanine compounds, anthraquinones, azines, and especially indanthrene compounds. The art of preparing greases from these particular classes of materials has not been developed. Consequently, the greases comprising such dyes normally require excessive amounts of the gelling agent to produce the grease structure.

As referred to hereinabove, greases have been prepared utilizing certain clays as the principal gelling agent. These are normally made oleophilic or water resistant by the adsorption thereon or reaction therewith of cationic materials, such as onium compounds or polyamines. However, for the most part these hydrophobing agents are subject to decomposition in the presence or heat or of ionizing radiation. Consequently, one of the principal objections to these greases comprises their lack of satisfactory stability under these conditions even though their lubricating characteristics under less stringent conditions are highly satisfactory.

While the dyes referred to above are highly satisfactory not only as grease-forming agents but also when such greases are subjected to high temperatures or ionizing radiation, they inherently are relatively expensive materials and consequently, their fields of utilization are correspondingly restricted because of economic reasons.

It is an object of the present invention to provide improved grease compositions.

It is another object of the present invention to provide a process for producing greases containing reduced amounts of grease-forming dyes.

It is a particular object of this invention to provide a process for the production of greases containing clays bearing strongly adsorbed dyes which do not have the staining properties of ordinary dye greases. Other objects will become apparent in the description of the invention.

Now, in accordance with the present invention an improved method for the preparation of greases comprises admixing an aqueous suspension of a clay with an aqueous suspension of water-insoluble dyes, adding to the mixture of suspensions a water-insoluble lubricating oil and thereafter dehydrating the mixture which is then subjected to shearing operations to produce a grease structure.

Still in accordance with the present invention, grease compositions are produced which comprise a lubricating oil containing a gelling proportion of a clay bearing strongly adsorbed dyes of the group consisting of indogen compounds, phthalocyanine compounds, indanthrene compounds, acyl derivatives of 9,10-dihydroxy-1,4-diaminoanthracene and acyl derivatives of 9,10-dihydroxy, 1,2-diaminoanthracene.

The benefits of the present invention comprise a remarkable reduction in the proportion of dye compound required to produce a grease structure and at the same time an elimination of the disadvantageous staining characteristics of dye greases as they have been previously produced. At the same time, however, the greases retain their characteristic identifying color which is advantageous for determining if sufficient quantities of grease are present on a bearing which should be lubricated. A further unexpected benefit comprises the lack of excessive hardening which occurs with either clay greases or dye greases as the result of heating and cooling cycles.

The proportion of clay to dye may vary widely but it is preferred in order to obtain the maximum advantages of the present invention to restrict the ratio of clay to dye (by weight) within the limits from 1:10 to 10:1. Still more preferably, the ratio is restricted to between about 1:4 and about 4:1.

Preferred (but not essential) additional limitations in the present process comprise the drying of the grease in relatively thin films (0.001–0.02 inch) at temperatures of 300–350° F. while the film of grease is being maintained by the passage of blades thereover, said blades moving at a rate of 1,000–10,000 feet per second at the point of contact with the grease-forming mixture. Another condition which has been found to promote the efficiency of the grease preparation process comprises the utilization of an azeotroping agent for the removal of water. These two conditions promote the "yield" of the gel-forming agents and substantially reduce the cost of producing the grease composition.

The advantages of the present invention are not obtained by mixing in the anhydrous state a clay gel grease with a dye gel grease. Under these latter conditions, the desired strong adsorption of the dye on the surface of the clay does not occur and the composition which results is a mere mixture of two greases which retain the disadvantageous staining properties of the original dye grease.

The aqueous clay suspensions to be utilized in the method of the present invention are preferably dilute enough so that the clay-water mixture can be readily poured, stirred or transferred by means of pipes from one piece of equipment to another. Consequently, it is preferred that when using clays exhibiting the normal high swelling capacity in water (such as bentonitic clays, including hectorite) that the proportion of clay be in the order of 0.25%–4% by weight of the slurry. However, clay base greases can be produced by utilizing clays of lower swelling capacity, such as attapulgite and the like. Under these conditions, the proportion of clay may be substantially higher and the aqueous clay slurries may contain as much as 5-20% by weight of the clay. These percentages are based upon clay slurries from which the non-clay components known as gangue have been removed.

The preferred type of clays are those which not only have a high swelling capacity in water but also have a relatively high base exchange capacity, particularly 25-100 milliequivalents of base exchange capacity per 100 grams of degangued clay. These include Wyoming bentonite and other bentonites, including the magnesium bentonite generally referred to as hectorite.

When the grease must have water-resistant properties, it is preferred that the aqueous clay slurry be modified by the addition of a phosphorus acid, preferably phosphoric acid in an amount of 1.0-10.0% by weight based on the anhydrous clay. The function of this phosphorus acid is not clear at the present time but is evidenced in the improved flocculation of the clay and consequently, improved grease properties particularly as they refer to the gelling properties of the grease under working conditions. The action does not appear to be one of mere acidification of the base exchange sites although this may be part of the action involved. Another function of the acid may be to convert calcium carbonate, present as an impurity, to a more desirable component such as calcium phosphate which appears to be more easily removed from the system. The phosphoric acid may be added at any stage during the grease-making process, that is, that it be added to the clay-water slurry prior or subsequent to mixture therewith of the dye suspension. Treatment of the clay slurry with the phosphorus acid appears to promote the strong adsorption of the dyes upon the surfaces of the clay particles. The mixture is more easily stirred before acid addition; hence, the dye can be more uniformly dispersed on the clay if acid is added subsequently.

Following preparation of the degangued clay slurry, a slurry of the dye is introduced or the dry dye powder may be added. The dye is normally manufactured and sold in the form of a water wet paste which may be used as received from the manufacturer or may be adjusted in water content to any degree. Normally the aqueous suspension of the dye will contain from 15-50% of the dye in the form of the manufactured press cake. More usually, this will comprise 20-40% by weight of the dye, the balance of the press cake being water or water modified with relatively volatile materials, such as alcohol, esters or ketones. The clay slurry likewise may be modified if so desired with such volatile materials which are preferably solvents miscible with water.

Dependent in part upon the degree of dilution of the clay and dye slurries, the two slurry suspensions are admixed with vigor either by stirring or by mixture in a colloid mill or the like. The dye is rapidly adsorbed upon the surfaces of the clay. A portion of the water may separate at this point and can be removed by centrifuging or decantation.

The most effective dye for use in high temperature greases has been found to be the parent compound of the series, namely indanthrene itself, but other indanthrene compounds may be employed. It is best to utilize the indanthrene compounds in their non-metallic form, that is, without neutralization of the carbonyl groups in said compounds with such ions as sodium or potassium, calcium, etc. While it is possible to employ the partially or fully neutralized indanthrene compounds as grease thickening agents, greases having maximum lubricating life at elevated temperatures are those in which the carbonyl groups are free of any metallic substituents. Typical indanthrene compounds suitable for the present purpose include the following:

Indanthrene
Flavanthrone
Pyranthrone
Violanthrone
3,3'-dichloroindanthrene
3-chloroindanthrene The indanthrene dyes, which are used as the gelling agents in the subject greases, contain two units of the following essential typical grouping per molecule:

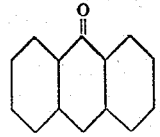

The tricyclic radical, it will be noted, has at least one carbonyl radical on the middle ring of the group. Some specific members of the indanthrene series, such as indanthrone, have two such carbonyl radicals attached to the middle ring. Others, such as flavanthrene, contain the single essential carbonyl radical, the tricyclic group being linked to a second such group by means of nitrogen linkages, or (as in the case of pyranthrone) through unsaturated hydrocarbon linkages. Thus, the two tricyclic nuclei may be linked by two —N= groups (as in flavanthrene); by two —NH— groups (as in indanthrene blue); by two =CH— groups (as in pyranthrone); or by intervening condensed ring systems (as in violanthrone). Another characteristic of the indanthrene dyes is that nitrogen is not a nuclear element present in the rings making up the essential tricyclic nuclei.

Another class of dye materials which may be utilized in high temperature greases prepared by the process of this invention include indogen compounds having the general structure:

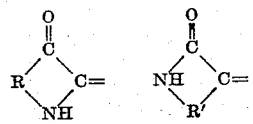

In the above formulae, R and R' represent aryl or alkylaryl radicals which are linked to the adjoining members of the heterocyclic rings by bonds disposed in orthro relation. These radicals may be the same or different and may be mono- or polycyclic, e.g., phenylene, biphenylene, naphthylene, etc. These aryl or alkaryl radicals may be substituted radicals, containing various substituents such as hydroxy, carboxy, halo, nitro, etc. Examples of such compounds are indigo, iso-indigo, 3-keto-indoline, isatide, isatin, etc. It should be understood that these specific examples are enumerated for purposes of illustration and not of limitation.

A third class of dye or pigment materials which may be employed in the production of high temperature greases by the process of this invention comprise phthalocyanines, which include not only metal free phthalocyanine but metal phthalocyanines such as zinc, nickel, aluminum, and particularly copper phthalocyanine. Chlorinated phthalocyanies and chlorinated metal phthalocyanines may also be employed. Of course, mixtures of dyes from one or more of these three main groups may be utilized in grease formation.

Another class of grease-forming dyes may be grouped under the following generic formula:

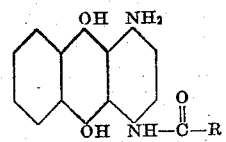

In the formula, R represents an alkyl group containing from about 3 to 24 carbon atoms.

Although the acyl derivatives of the 9,10-dihydroxy-1,4-diamino anthracene within the range set out above have both oxidation inhibiting properties and thickening power, when it is desired to use the materials of invention primarily as a thickening agent, the acyl derivatives wherein R contains from 12 to 22 carbon atoms are preferable. When oxidation inhibition is the primary function desired, R should contain from about 3 to about 16 carbon atoms. A useful combination comprises a dye of the shorter chain oxidation inhibiting type together with another dye primarily useful as the main gelling agent.

The acyl derivatives of the invention are prepared by heating the 9,10-dihydroxy-1,4-diamino-anthracene with the organic acid at reaction temperatures of about 100 to 250° C. Boric acid may be used as a catalyst for the reaction. The product may be purified by slurrying with water containing small amounts of caustic.

Suitable species of such dyes include the following:

1-N-stearoyl-1,4-diamino-9,10-dihydroxyanthracene
1-N-dodecoyl-1,4-diamino-9,10-dihydroxyanthracene
1-N-octoyl-1,4-diamino-9,10-dihydroxyanthracene
1-N-propoyl-1,4-diamino-9,10-dihydroxyanthracene
1-N-heptoyl-1,2-diamino-9,10-dihydroxyanthracene
1-N-stearoyl-1,2-diamino-9,10-dihydroxyanthracene
1-N-decoyl-1,2-diamino-9,10-dihydroxyanthracene The corresponding 1,4-diamino-anthraquinones may be utilized as well.

It is preferred that subsequent to the admixture of the clay and dye aqueous suspensions the mixture so formed is heated to a temperature between about 100° F. and the boiling point of the mixture. The boiling point will vary depending upon whether or not lower boiling diluents, such as alcohols, ketones and esters and the like are present. The period of heating preferably together with stirring may be from one minute to four hours, and the principal purpose of this heating period is to homogenize the mixture so formed. A lubricating oil is then added to the mixture and water is removed therefrom. The proportion of lubricating oil is not critical but should be sufficient to maintain the expanded structure of the combined gelling agent during and following the removal of water. Consequently, the proportion of lubricating oil added at this time may be as low as 10% by weight of the combined clay and dye but preferably is added in a major proportion, namely, greater than the weight of the dye and clay and still more preferably in the final proportion to be utilized in the grease composition.

The lubricating oil chosen to form the greases of invention may be widely varied. The oil chosen to prepare the grease composition should be capable of performing the lubricating function if it could be used as a liquid. Mineral lubricating oils having a viscosity within the range of from about 35 to about 200 SUS at 210° F. may be used for most applications. The mineral oil may be of a paraffinic or of a naphthenic nature depending upon the crude source, and any of the various distillates refined by the various refinery techniques are operable.

Synthetic lubricating oils may also be utilized in preparing the lubricating greases of this invention. Synthetic lubricating oils having a viscosity within the range stated above are operable. These oils include esters of mono-basic acids, such as the $C_8$ Oxo alcohol ester of $C_8$ Oxo acid, esters of $C_{13}$ Oxo alcohol and octanoic acid, etc., esters of dibasic acids, such as di-2-ethylhexyl sebacate, di-nonyl adipate, etc., esters of glycols, e.g. the $C_{13}$ Oxo acid diester of tetraethylene glycol, etc., complex esters, such as the complex ester formed by reacting one mol of sebacic acid with two mols of tetraethylene glycol and two mols of 2-ethyl hexanoic acid, complex esters formed by reacting one mol of tetraethylene glycol with two mols of sebacic acid and two mols of 2-ethyl hexanol, complex esters formed by reacting together one mol of azelaic acid, one mol of tetraethylene glycol and one mol of $C_8$ Oxo acid, and the like, esters of phosphoric acid, such as the ester formed by contacting three mols of the mono-methyl ether of ethylene glycol with one mol of phosphorus oxychloride, halocarbon oils, such as the polymers of chlorotrifluorethylene, alkyl silicon compounds, such as methyl polysiloxanes, ethyl polysiloxanes, methyl-phenyl polysiloxanes, ethyl-phenyl polysiloxanes, chlorophenyl silicones, and the like, sulfite esters such as those formed by reacting one mol of sulfur oxychloride with two mols of the methyl ether of ethylene glycol and the like, carbonates such as those formed by reacting $C_8$ Oxo alcohol with ethyl carbonate to form a half ester and reacting this half ester with tetraethylene glycol, mercaptals such as those formed by reacting 2-ethylhexyl mercaptan with formaldehyde, formals such as those formed by reacting $C_{13}$ Oxo alcohol with formaldehyde, polyglycols, such as those formed by condensing butyl alcohol with up to fifty units of propylene oxide, or mixtures of any of the above synthetic oils in any proportions.

Water may be removed from the composition by other means than distillation such as by solvent replacement with a water miscible liquid such as acetone or isopropyl alcohol. This, however, requires a relatively inefficient process and should be avoided if it is possible to do so when utilizing the specific components at hand. The preferred process comprises distillation in the presence of an azeotroping agent. The term "azeotroping agent" will be understood to be any liquid having a boiling point up to 150° C. above that of water which at the temperature of boiling of the mixture forms an azeotrope with water. Such materials are those already briefly referred to, namely, alcohols, ketones and esters. Preferred materials include methanol, ethanol, isopropanol and butanol and isobutanol as well as acetone, methyl, ethyl ketone, methyl isobutyl ketone and ethyl acetate. Benzene may be employed for this purpose as well as toluene or the xylenes. The distillation of water either with or without the use of the preferred azeotroping agent may be conducted under atmospheric or reduced pressure.

Of course, the technique of aerogel formation may be employed but this is regarded as an uneconomical procedure unless it is found to be essential under specific circumstances. If the aerogel formation technique is required, this comprises solvent displacement of water with a low boiling material such as acetone or alcohol to form an essentially anhydrous clay-dye composition with or without oil being present. The solvent and clay-dye are then heated in an autoclave to a temperature above the critical temperature of the solvent at which time the pressure is released and the solvent is flashed away leaving the clay and dye in the highly expanded state suitable for incorporation in oil to form a grease. The oil may be present during this flash removal of the low boiling solvent or it may be added subsequently.

If an azeotroping agent is employed as is preferred, the proportion thereof will depend upon the quantity of water present. The amount of solvent necessary to form an azeotrope with water is a matter well-known in the art and will vary from one specific azeotroping agent to another. Normally, however, when employing such materials as alcohols, ketones or monocyclic aromatics such as benzene, a portion of water to azeotropic agent will normally be between about 1 to 1 and about 1 to 10.

The invention will be more clearly demonstrated by the following illustrated examples:

EXAMPLE I

*Formulation*

| Ingredients: | Percent by weight |
|---|---|
| Hectorite clay | 4.2 |
| $H_3PO_4$ | 0.25 |
| Indanthrene dye | 3.4 |
| Methyl phenyl silicone oil (Dow Corning Fluid DC–550) | 92.15 |

*Preparation*

The hectorite clay was dispersed in water and gangue removed by centrifuging to leave a clay suspension containing 2% by weight of the clay. This suspension was modified by the addition of the indanthrene dye, which was added thereto in the form of an aqueous paste containing 1.6% by weight of the dye. Phosphoric acid was then added. The mixture was stirred and heated to the boiling point to form a soft gel. Isopropyl alcohol (6 parts by weight per part of water) and silicone oil (12.3 parts per part of combined clay and dye) were added and the water and alcohol were removed by azeotropic distillation. The grease was then passed through a three-roll paint mill to form a grease structure. This grease had the following properties:

| | |
|---|---|
| Water absorption | percent__ 35 |
| Water washout at 100° F. | do____ 0 |
| Unworked penetration | 216 |
| Worked, 60 strokes penetration | 227 |
| Worked, 100,000 strokes penetration | 330 |
| Bearing test at 600° F. ABEC | hours__ 62 |

EXAMPLE II

*Formulation*

| Ingredient: | Percent |
|---|---|
| Hectorite clay | 4.2 |
| $H_3PO_4$ | 0.25 |
| Indigo | 3.4 |
| Bright stock mineral oil | 92.15 |

*Preparation*

The hectorite clay slurry was prepared as described in Example I and modified with phosphoric acid. Indigo powder was mixed therewith after which the bright stock oil and isopropyl alcohol were added, the alcohol being present in an amount of about 6 parts per part of water. The mixture so formed was dehydrated in a thin film dryer operated under high pressure steam and having a skin temperature of about 330° F. Ingredients were maintained in a film 0.02 inch in thickness by rotating blades having a speed of about 5,000 feet per minute at the point of contact with the grease film. The residence time in the dryer was about 20 seconds. The grease ingredients were then passed to a forced draft air oven and held in a quiescent state at about 450° F. for about one hour, after which the heat treated material was homogenized on a three-roll paint mill to obtain a finished grease. This grease had the following properties:

| | |
|---|---|
| Water absorption | percent__ 35 |
| Water washout at 100° F. | loss__ 0 |
| Unworked penetration | 233 |
| Worked, 60 strokes, penetration | 237 |
| Worked, 100,000 strokes, penetration | 342 |

EXAMPLE III

*Formulation*

| Ingredients: | Percent |
|---|---|
| Wyoming bentonite | 4.2 |
| $H_3PO_4$ | 0.25 |
| Copper phthalocyanine | 3.4 |
| DC–550 silicone oil | 92.15 |

*Preparation*

A grease was prepared having the above formulation. This grease was produced by forming a 3% aqueous suspension of the Wyoming bentonite and modifying it by the addition of the phosphoric acid. Copper phthalocyanine was added to this modified suspension in the form of an aqueous paste containing about 50% by weight of the dye. The mixture was then heated to a temperature of about 150° F. for a period of about one-half hour after the addition of an amount of isopropyl alcohol substantially equal to the azeotropic amount necessary for the water present. Thereafter the silicone lubricant was added and the mixture subjected to the thin film drying as described in the preceding example. After dehydration was completed, the composition was milled to a suitable grease consistency. This grease had the following properties:

| | |
|---|---|
| Water absorption | percent__ 30 |
| Water washout at 100° F. | do____ 0 |
| Unworked penetration | 217 |
| Worked, 60 strokes, penetration | 236 |
| Worked, 100,000 strokes, penetration | 345 |

The grease compositions made in accordance with the present invention are characterized by their lack of staining properties and their substantially reduced cost as compared with similar greases from which clay is omitted or from which the strongly adsorbed dye is not deposited directly on the water wet clay. They comprise a gelling proportion of the dye strongly adsorbed on clay which is normally between about 5% and about 30% by weight of the grease composition and about 70–95% by weight of a water immiscible lubricant. The proportion of phosphoric acid, if present, is normally directly related to the weight of the clay but is usually present in an amount between about 0.10% and about 0.30% by weight of the total grease composition.

We claim as our invention:

1. In the process for the preparation of a grease composition, the steps comprising mixing an aqueous clay suspension with an aqueous indanthrene suspension in a clay:indanthrene weight ratio between about 1:10 and 10:1, adding a major proportion of a lubricating oil thereto, substantially dehydrating the mixture and shearing the dehydrated product, whereby a grease composition is formed.

2. In the process for the preparation of a grease composition, the steps comprising mixing an aqueous clay suspension with an aqueous indigo suspension in a clay:indigo weight ratio between about 1:10 and 10:1, adding a major proportion of a lubricating oil thereto, substantially dehydrating the mixture and shearing the dehydrated product, whereby a grease composition is formed.

3. In the process for the preparation of a grease composition, the steps comprising mixing an aqueous clay suspension with an aqueous suspension of a dye of the group consisting of indanthrene compounds, indogen compounds, phthalocyanines, N-acyl derivatives of 9,10-dihydroxy-1,4-diaminoanthracenes, N-acyl derivatives of diaminoanthraquinones and N-acyl derivatives of 9,10-dihydroxy, 1,2-diaminoanthracenes in a clay:dye weight ratio between about 1:10 and 10:1, adding a major proportion of a lubricating oil thereto, substantially dehydrating the mixture and shearing the dehydrated product, whereby a grease composition is formed.

4. In the process for the preparation of a grease composition, the steps comprising mixing an aqueous clay suspension with an aqueous suspension of a dye of the group consisting of indanthrene compounds, indogen compounds, phthalocyanines, N-acyl derivatives of 9,10-dihydroxy-1,4-diaminoanthracenes and N-acyl derivatives of 9,10-dihydroxy, 1,2-diaminoanthracenes in a clay:dye weight ratio between about 1:10 to 10:1, adding thereto a lubricating oil and an azeotroping agent, substantially completely removing water by azeotropic distillation, and shearing the dehydrated product, whereby a grease composition is formed.

5. The process which comprises mixing an aqueous bentonitic clay suspension with an aqueous indanthrene suspension in a clay:indanthrene weight ratio between about 1:4 and about 4:1, adding a major amount of a methylphenylsiloxane lubricating oil thereto and a lower aliphatic alcohol, in a water:alcohol weight ratio between about 1:1 and about 1:10, removing water and alcohol by azeotroping distillation and shearing the substantially anhydrous product, whereby a grease composition is formed.

6. A process according to claim 3 wherein the clay suspension is modified by the addition thereto of phosphoric acid in a clay:acid weight ratio between about 100:1 and 100:10.

7. A grease composition comprising a major proportion of a lubricating oil and a minor proportion sufficient to gel said oil to a grease consistency of a clay-indanthrene product resulting from the adsorption of indanthrene on clay in the presence of water, the clay:indanthrene weight ratio being between about 10:1 and about 1:10.

8. A grease composition comprising a major proportion of a lubricating oil and a minor proportion sufficient to gel said oil to a grease consistency of a clay-dye product resulting from the adsorption of dye on clay in the presence of water, the dye being of the group consisting of indanthrene compounds, indogen compounds, phthalocyanines, N-acyl derivatives of 9,10-dihydroxy-1,4-diaminoanthracenes, N-acyl derivatives of 9,10-dihydroxy-1,2-diaminoanthracenes and N-acyl derivatives of diaminoanthraquinones, the clay:dye weight ratio being between about 10:1 and about 1:10.

References Cited in the file of this patent

UNITED STATES PATENTS

| | | |
|---|---|---|
| 2,597,018 | Merker et al. | May 20, 1952 |
| 2,623,853 | Stross | Dec. 30, 1952 |
| 2,679,480 | Brannen et al. | May 25, 1954 |
| 2,791,560 | Dilworth et al. | May 7, 1957 |
| 2,816,074 | Cottle et al. | Dec. 10, 1957 |
| 2,848,417 | Armstrong et al. | Aug. 19, 1958 |